April 5, 1960   J. GOLDSTEIN   2,931,427
VENTILATED SEAT CUSHION
Filed Feb. 24, 1959   2 Sheets-Sheet 1
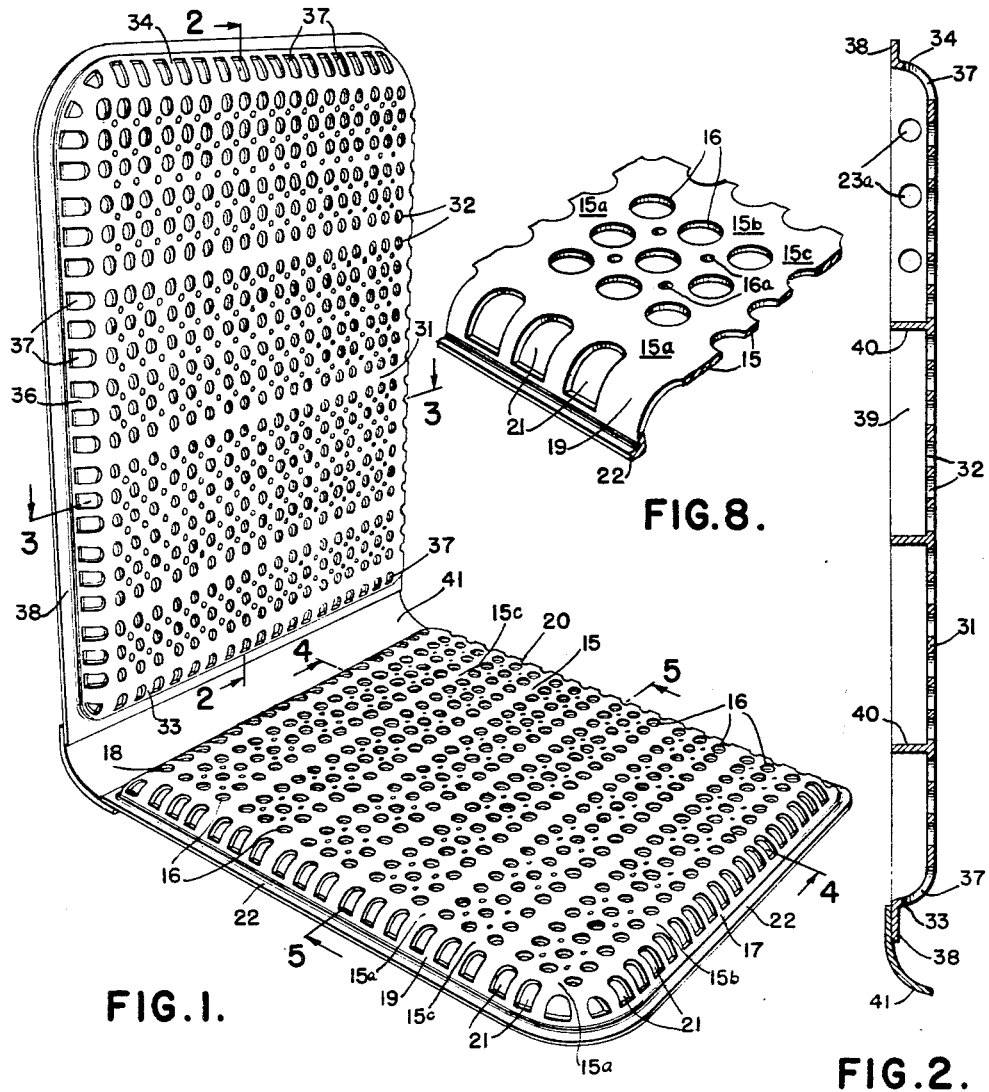
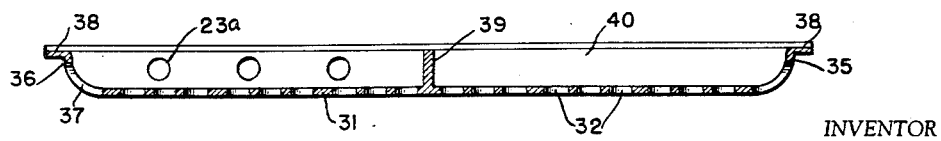
INVENTOR
Joseph Goldstein
BY Wilkinson, Mawhinney & Thibault
ATTORNEYS INVENTOR
Joseph Goldstein BY Wilkinson Mawhinney & Thibault
ATTORNEYS

United States Patent Office 2,931,427
Patented Apr. 5, 1960

2,931,427

VENTILATED SEAT CUSHION

Joseph Goldstein, Verona, N.J.

Application February 24, 1959, Serial No. 795,015

3 Claims. (Cl. 155—182)

The present invention relates to ventilated seat cushion and has adaptability to automobiles, outdoor furniture, office chairs, or in general any seating applications.

Heretofore commercially acceptable seat cushions of this character have been constructed of coiled wire enclosed within casings or covers of fabric, straw or the like but such cushions suffer from certain infirmities, among which might be prominently mentioned the expense of the wire and of the fabricating of the same into resilient coils, the additional cost of the casings and of the labor in assembling the springs to the casings, the tendency of such cushions to flatten out under the weight of the occupant with loss of accessible ventilation, the necessary high retail price of the cushions and the consequent sales resistance involved.

It is an object of the invention to produce a seat cushion in a single operation from a single material, which latter is relatively inexpensive as is also the mode of production.

Another object of the invention is to provide a ventilated seat cushion made from a plastic or resin substance subject to an inexpensive molding operation by which all of the elements of the cushion may be fabricated in one operation and preferably result in an integral end product which will have sufficient stability to avoid its collapse under the incumbent weight of the user and which will support persons of great weight without impairing the value of its ventilating characteristic.

The invention also has for a further object to provide a molded plastic ventilated seat cushion in which the plastic, preferably one of the polyethylene family of plastics, will possess, in its fabricated seat cushion form, sufficient rigidity to insure the stability heretofore referred to but at the same time to possess a certain elasticity which will permit the cushion to locally yield under rupturing stresses to render the plastic material of the cushion substantially unbreakable under limited distortion and to endow the product with sufficient inherent resiliency to regain its shape following each distortion when the causing stress has been removed.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is an isometric view of connected seat and back cushions constructed in accordance with the present invention and in an attitude of use.

Figure 2 is a vertical section taken through the back cushion on the line 2—2 in Figure 1, the same being on a somewhat enlarged scale.

Figure 3 is a cross-horizontal section taken through the back cushion on an enlarged scale on the line 3—3 of Figure 1.

Figure 8 is a magnified view of the perforation plan of the seat and/or back cushions of this invention.

Figure 6:
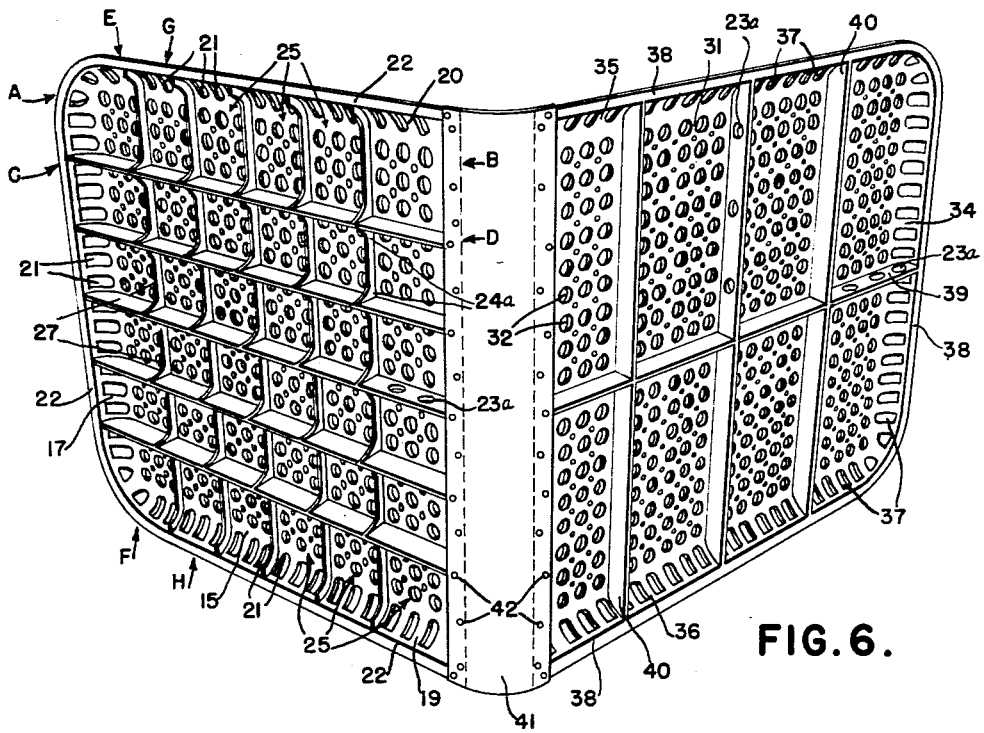
Figure 6 is an isometric view of the underside of the seat cushion and the rear portion of the back cushion.

Referring more particularly to the drawings, 15 designates a substantially flat plate seat having ventilating perforations 16 therein and 17 and 18 represent front and rear walls and 19 and 20 side walls which merge into the edges of the seat plate 15 and are curved downwardly and outwardly from the plane of the seat plate 15 with the lower edges of the walls terminating in outturned marginal base flanges 22 which extend outwardly from all four quarters of the seat plate 15 although these flanges lie in a plane spaced from the plane of the seat plate.

The various walls have ventilating apertures 21 therethrough which are preferably in the form of slots substantially rectangular except that upper ends are preferably rounded or curved where the walls turn into the edges of the seat plate 15.

Between these planes and in the space circumscribed by the several walls 17, 18, 19, 20 there is fitted a cellular rigidifying and supporting structure which advantageously comprises two groups of partitions, namely a first longitudinal group 23 and a second transverse group 24. These partitions preferably intersect at substantially 90 degrees to one another and between the same they form intersecting rows of air cells 25. These cells are accessible to the external atmosphere through the ventilating apertures 21 in the various walls by which air from the external atmosphere may constantly circulate to the air cells 25. This cooling air is accessible to the person of the occupant of the seat through the various ventilating perforations 16.

Certain of the partitions may have cut-away portions 27. In the single embodiment of the invention illustrated in the drawings, these cut-away portions 27 are provided only in the second group 24 of the partitions. In this form of the invention, longitudinal ventilating channels, such as indicated at A—B and C—D are composed of communicating air cells 25 completely through from the front wall 17 to the rear wall 18. Ventilating air may freely flow from one end to the other of all the ventilating channels.

On the other hand, the transverse channels represented at E—F and G—H are blocked at each cell by the sections of the partitions 23 between the intersections thereof with the second group partitions 24. The lower edges of the partitions 23 will extend down substantially into the same plane with the flanges 22 so that the flanges and the partitions 23 will together support the cushion upon the seat of an automobile, or the seat of a chair or other like support. The support thus afforded by the partitions will tend to preserve the stability of the flat seat plates 15 and prevent the same from collapsing downwardly under the incumbent weight of the occupant so that undue distortion of the seat plate 15 is prevented which otherwise might result in cracking, breaking or the like.

The back cushion may be formed in a manner similar to the seat cushion and consists generally in a flat back plate 31 having ventilating perforations 32 therethrough. Lower and upper curved walls 33 and 34 extend outwardly from the lower and upper edges respectively of the back plate 31 and curve rearwardly. Similar side walls 35 and 36 extend off the side edges of the back plate 31. In these various walls are ventilating apertures 37 preferably in the form of elongated slots of a generally rectangular form only preferably having their inner edges curved so as to merge more gradually with the side edges of the back plate 31 and avoiding sharp edges at locations of the plastic which are on a curve. The curved forward edges of these ventilating apertures 37 also diminish the distance across the apertures so as not to unduly weaken the edges of the back plate as it is desired to have substantial amounts of the plastic material at all areas along the edges of the back plate where the back plate is supported by the four walls containing the ventilating apertures 37. This avoids diminishing factors of strength and stability as a result of which both the seat plate and the back plate will resist weights and thrusts imposed upon the same without undue sagging, cracking or rupturing.

The outturned marginal rear flanges 38 of the back cushion are in a plane offset backwardly from the plane of the back plate 31 so as to engage the back of an automobile seat or the back of a chair or the like and to thus space the back plate 31 therefrom.

The rigidifying structure provided by the central longitudinal vertical partition 39 and the cross-horizontal partitions 40 also assist the outturned flanges 38 to prevent the back plate 31 from collapsing rearwardly when great weights and thrusts are imposed thereupon. This rigidifying structure 39, 40 is contained within the confines of the various walls 33, 34, 35 and 36 and the rear edges of the partitions 39, 40 will preferably be substantially in the same plane with the rear surfaces of the outturned flanges 38. The rigidifying structures both of the seat cushion and the back cushion will prevent the structure from weaving when subjected to horizontal strains as of the lunging of the body of the occupant incident to centrifugal force developed by a vehicle in cornering.

Figure 7:
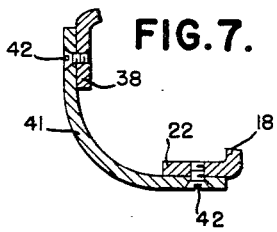
Figure 7 is a sectional view of the detail showing a connecting flexible hinge between the seat and back sections.

By referring more particularly to Figure 7, 41 designates a plastic resilient strip or band the edges of which lap the flanges 22 and 38 of the seat and back cushions respectively, fastenings 42, such as screws being passed through the overlapped edges of the plastic strip 41 and taking into threaded openings in the flanges 22, 38. This affords a convenient flexible hinged joint between the seat cushion and the back cushion.

It will be understood that the seat cushion may be used alone without the back cushion.

The improved seat cushion may be molded in one operation including the seat plate 15, the walls 17, 18, 19 and 20, the outturned base flanges 22 and including also the rigidifying structure comprising the partitions 23 and 24. Such structure presents not only the desirable characteristics of plastic but also having the value of an integral structure which in itself tends to strength.

A cushion according to the invention constitutes an attractive article of commerce, can be offered to the trade at an attractive retail price and is such as to retain at all times its maximum ventilating qualities irrespective of wide variations in weight and thrust to which the same may be subjected in use.

Referring more particularly to Figure 8, in conjunction with Figures 1, 4, 5 and 6, the orifice pattern which has many advantages is that of nine hole units. In each unit the ventilating perforations 16 are arranged in spaced rows of three each, the perforations 16 being circular or round, and each unit constituting a square separated from all other units or squares by blank areas 15$^a$, 15$^b$, 15$^c$ and 15$^d$ and at the edges of the seat plate 15 from the slots 21 in the various walls 17, 18, 19, 20. The blank areas 15$^a$, 15$^b$, 15$^c$ and 15$^d$ of all the units are in alinement lengthwise and crosswise of the seat plate 15 and form intersecting lines of division between the squares, establishing solid lines of unweakened plate thicknesses which contribute to the support of the zones which are weakened by the perforations and apertures. However the perforations 16 and apertures 21 not only supply ventilation but also promote flexibility.

Figure 4:
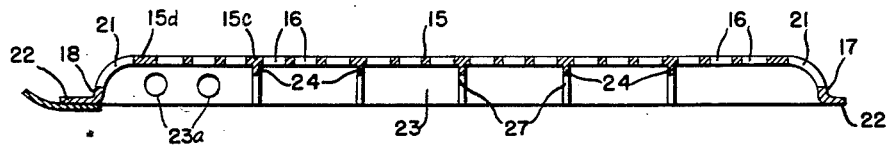
Figure 4 is a longitudinal sectional view taken on an enlarged scale through the ventilated seat cushion on the line 4—4 in Figure 1.
Figure 5:
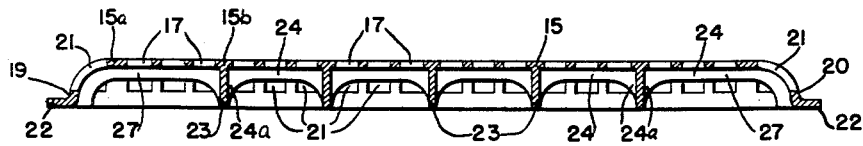
Figure 5 is a cross-sectional view taken on an enlarged scale through the seat cushion on the line 5—5 in Figure 1.

It will be noted from Figures 4 and 5 that the blank areas 15$^a$, 15$^b$, 15$^c$ and 15$^d$ occur at the partitions 23, 24 to unite therewith in the functions of rigidifying the seat plate 15. These functions are furthered by the fillets 24$^a$ of the partitions 24 (Figure 5) which adjoin the intersections with the partitions 23 and extend down close to the lower edges of the latter partitions.

The perforations 16 (Figure 8) are preferably round to produce the greatest geometrical passage area with minimum loss of the material of the seat plate 15 so that no sacrifice of strength in the seat is entailed. By arranging round perforations in parallel and intersecting rows the sections of the plate seat between each group of four perforations 16 is relatively large and more than ample to sustain the perforated portions so that it is feasible to provide in such sections small holes 16$^a$ which distribute the area of ventilation substantially throughout the length and breadth of the seat plate.

It will be apparent that the back plate 31 has the same perforation or foraminous pattern with the same advantages.

Perforations 23$^a$ may be molded or otherwise produced in the partitions 23 to set up ventilation communication between the various cells. Such perforations 23$^a$ in the partitions 23 may be used in conjunction with the cutaway portions of the partitions 24, or all of the partitions may be provided with such perforations.

The seat cushion may, if desired, be secured in place by means of hooks, elastic or other straps, and by any other means.

It will be understood that the plastic seat cover of this invention eliminates all of the drawbacks presently encountered with wire ventilated cushions, such drawbacks among others, involving rusting of the springs, snagging of the wires, and consequent damage to the upholstery of the vehicle.

Figure 9:
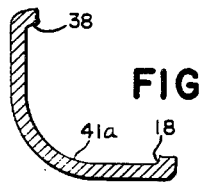
Figure 9 is a view similar to Figure 7 showing a modification.

Referring more particularly to Figure 9, 41$^a$ represents a plastic flexible hinge strip molded in one piece with the parts 22 and 38 of the seat and back cushions, thus avoiding the use of the fastening screws 42 or any other fastenings as shown in Figure 7.

It will be understood, of course, that mechanical hinges may be employed to connect the seat cushion and the back cushion for folding and adjustment at appropriate angles.

The seat cushion or combined seat cushion and back cushion can, if desired, be encased in a suitable fiber or other cover, decorated or not.

It will be understood that as far as the perforation pattern is concerned, one form only of which the invention is susceptible is illustrated in the drawings in which the perforations are round and grouped in nine perforation arrangements. However, the perforations may be rectangular, triangular or of any other geometrical configuration and may be mounted in groups of any suitable number and in any desired pattern association.

It will be understood that the seat cushion or combined back and seat cushion of this invention may be manufactured in various sizes and shapes to fit various needs and various types of automobile and other seats and may, if desired, be incorporated as permanent parts of seats in automobile and furniture factories.

Where the hinged joint 41$^a$ of Figure 9 is employed, it will be understood that both seat cushion and back cushion are molded in a single operation and that the entire structure, including both cushions, is integral. The hinge strip 41$^a$ of Figure 9, as well as the other hinge strip 41, instead of being in a continuous piece all the way across the gap between the seat and back cushions, may be formed with gaps therebetween. In other words the flexible hinge may be formed in separate strip or bands which are spaced suitable distances apart.

Although I have disclosed herein the best forms of the

What is claimed is:

1. In a cushion, a substantially flat plate having ventilating perforations therethrough, said perforations extending over substantially the entire area of said plate, walls depending from said plate at the margins thereof and having ventilating apertures therein, said walls being of equal height and having at the margins thereof remote from said plate an outwardly turned flange, said flange lying in a plane substantially parallel to said flat plate, and an integral grid structure depending from the plate and comprising first and second groups of partitions, the partitions of each group being substantially parallel, the partitions of at least one group extending substantially to the plane of said flange, means for communicating each said plate perforation with at least one of said wall apertures, whereby said flange and some of said partitions may engage a support to sustain said plate in spaced relation thereto, whereby said plate may yield under the application of an area load applied thereto and whereby air may freely circulate through said plate and walls.

2. In a cushion, a substantially flat plate having ventilating perforations therethrough, said perforations extending over substantially the entire area of said plate, walls depending from said plate at the margins thereof and having ventilating apertures therein, said walls being of equal height and having at the margins thereof remote from said plates an outwardly turned flange, said flange lying in a plane substantially parallel to said flat plate, and an integral grid structure depending from the plate and comprising first and second groups of partitions, the partitions of each group being substantially parallel, said partitions extending substantially to the plane of said flange, apertures in said partitions for communicating each said plate perforation with at least one of said wall apertures, whereby said flange and some of said partitions may engage a support to sustain said plate in spaced relation thereto, whereby said plate may yield under the application of an area load applied thereto and whereby air may freely circulate through said plate and walls.

3. In a cushion, a substantially flat plate having ventilating perforations therethrough, said perforations extending over substantially the entire area of said plate, walls depending from said plate at the margins thereof and having ventilating apertures therein, said walls being of equal height and having at the margins thereof remote from said plates an outwardly turned flange, said flange lying in a plane substantially parallel to said flat plate, and an integral grid structure depending from the plate and comprising first and second groups of partitions, the partitions of each group being substantially parallel, the partitions of one group extending substantially to the plane of said flange, and the partitions of the other group being of lesser depth than the partitions of said first group, whereby said flange and some of said partitions may engage a support to sustain said plate in spaced relation thereto, whereby said plate may yield under the application of an area load applied thereto and whereby air may freely circulate through said plate and walls.

References Cited in the file of this patent

UNITED STATES PATENTS

| | | |
|---|---|---|
| 2,734,556 | Hebrank | Feb. 14, 1956 |
| 2,804,129 | Propst | Aug. 27, 1957 |
| 2,827,952 | Propst | Mar. 25, 1958 |
| 2,836,228 | Dahle | May 27, 1958 |
| 2,845,998 | Estabrook et al. | Aug. 5, 1958 |